(12) United States Patent
Horiba et al.

(10) Patent No.: US 8,602,752 B2
(45) Date of Patent: Dec. 10, 2013

(54) ELECTRIC COMPRESSOR

(75) Inventors: Tatsuya Horiba, Kariya (JP); Taizo Hirano, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 608 days.

(21) Appl. No.: 12/156,764

(22) Filed: Jun. 4, 2008

(65) Prior Publication Data

US 2008/0317614 A1 Dec. 25, 2008

(30) Foreign Application Priority Data

Jun. 4, 2007 (JP) ................................ 2007-148486

(51) Int. Cl.
*F04B 17/00* (2006.01)

(52) U.S. Cl.
USPC ..................................... 417/410.5; 417/410.1

(58) Field of Classification Search
USPC ............ 417/410.1, 410.5, 371; 310/12.23, 52
See application file for complete search history.

(56) References Cited

U.S. PATENT DOCUMENTS

| | | | |
|---|---|---|---|
| 3,575,623 A * | 4/1971 | Stine .............................. | 310/260 |
| 6,936,938 B2 | 8/2005 | Ioi | |
| 7,025,577 B2 * | 4/2006 | Ioi et al. ......................... | 417/371 |
| 2001/0036414 A1 * | 11/2001 | Makino et al. ................. | 417/312 |
| 2002/0073729 A1 | 6/2002 | Shibuya | |
| 2004/0109771 A1 * | 6/2004 | Ioi et al. ....................... | 417/410.5 |
| 2005/0116572 A1 * | 6/2005 | Fukasaku et al. ............. | 310/207 |
| 2006/0038459 A1 * | 2/2006 | Adaniya et al. ............... | 310/180 |
| 2006/0131987 A1 * | 6/2006 | Uetsuji et al. ................. | 310/270 |
| 2008/0159886 A1 * | 7/2008 | Ku et al. ..................... | 417/410.5 |
| 2009/0269222 A1 * | 10/2009 | Fukasaku et al. .......... | 417/410.1 |

FOREIGN PATENT DOCUMENTS

| | | |
|---|---|---|
| EP | 1 384 893 A2 | 1/2004 |
| EP | 1 401 085 A2 | 3/2004 |
| JP | 56-056142 A | 5/1981 |
| JP | 62-4853 | 1/1987 |
| JP | 2000-303953 | 10/2000 |
| JP | 2003-219591 A | 7/2003 |
| JP | 2004-328823 A | 11/2004 |
| JP | 2005-229672 A | 8/2005 |
| JP | 2006-033915 A | 2/2006 |

OTHER PUBLICATIONS

English translation of a first office action for corresponding Chinese application No. 2008-10099754.1, issued, on Aug. 21, 2009.

(Continued)

*Primary Examiner* — Charles Freay
*Assistant Examiner* — Alexander Comley
(74) *Attorney, Agent, or Firm* — Locke Lord LLP (57) ABSTRACT

An electric compressor is disclosed in which gas in a motor housing of a rotating electric machine is drawn into a compression chamber and then discharged by the rotating electric machine. The rotating electric machine includes a stator, teeth, coils of different phases, and phase-to-phase insulation sheets provided between coils of different phases. An inlet port is provided in the motor housing. The inlet port draws gas from the outside of the motor housing. An inflow direction of the gas flowing through the inlet port intersects a coil end of one of the coils. A part of the phase-to-phase insulation sheet faces the inlet port and covers an intersection surface of the coil end that intersects the inflow direction.

8 Claims, 6 Drawing Sheets

(56) References Cited

OTHER PUBLICATIONS

Japanese Office Action for Application No. 2007-148486, dated Dec. 13, 2011.

Notice of Allowance from corresponding Japanese Patent Application No. 2007-148486, dated Jul. 17, 2011.

Extended European Search Report issued in corresponding European Patent Application No. 08157485.7-1608 dated Jul. 22, 2013.

* cited by examiner

ELECTRIC COMPRESSOR

BACKGROUND OF THE INVENTION

The present invention relates to an electric compressor in which a phase-to-phase insulation sheet is provided between phases of coils that pass through slots of stator of a rotating electric machine.

For example, Japanese Laid-Open Patent Publication No. 2000-303953 discloses an electric compressor in which refrigerant is first conducted into a motor housing of a rotating electric machine, and is then drawn into a compression chamber. The configuration in which refrigerant is conducted into the motor housing before it is compressed in the compression chamber contributes to cooling of the rotating electric machine.

In the electric compressor disclosed in the publication, a suction tube is coupled to a peripheral wall of the motor housing, which is a sealed container. Refrigerant is conducted through the suction tube into the sealed container. The direction of the flow of the refrigerant from the suction tube into the sealed container intersects a coil end. If foreign matter is mixed in the refrigerant, the foreign matter can collide with the coil end and damage the insulation coating on the surface. This may lower the insulation resistance.

In the electric compressor disclosed in the publication, a synthetic resin reinforcing member is provided at a portion of the coil end that intersects the inflow direction. Foreign mater in refrigerant hits the reinforcing member, which prevents the coil from being damaged.

However, the reinforcing member not only increases the number of the components of the electric compressor, but also increases the steps of assembly of the electric compressor since the reinforcing member needs to be held at a predetermined position.

SUMMARY OF THE INVENTION

It is an objective of the present invention to prevent coils from being damaged by foreign matter in refrigerant without increasing the number of the components of an electric compressor.

To achieve the foregoing objective and in accordance with one aspect of the present invention, an electric compressor is provided, in which gas in a motor housing of a rotating electric machine is drawn into a compression chamber by a suction motion of a compression motion body based on rotation of a rotary shaft driven by the rotating electric machine, and the gas in the compression chamber being discharged by discharge motion of the compression motion body based on the rotation of the rotary shaft. The rotating electric machine includes an annular stator, a plurality of teeth arranged on an inner circumference of the stator, a plurality of coils of different phases passing through slots between the teeth, and a phase-to-phase insulation sheet located between coils of different phases. An inlet port is provided in the motor housing, the inlet port drawing gas from the outside of the motor housing. An inflow direction of the gas flowing through the inlet port intersects a coil end of the coils. A part of the phase-to-phase insulation sheet faces the inlet port and covers an intersection surface of the coil end that intersects the inflow direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An electric compressor according to a first embodiment of the present invention will now be described with reference to FIGS. 1 to 6.

Figure 1:
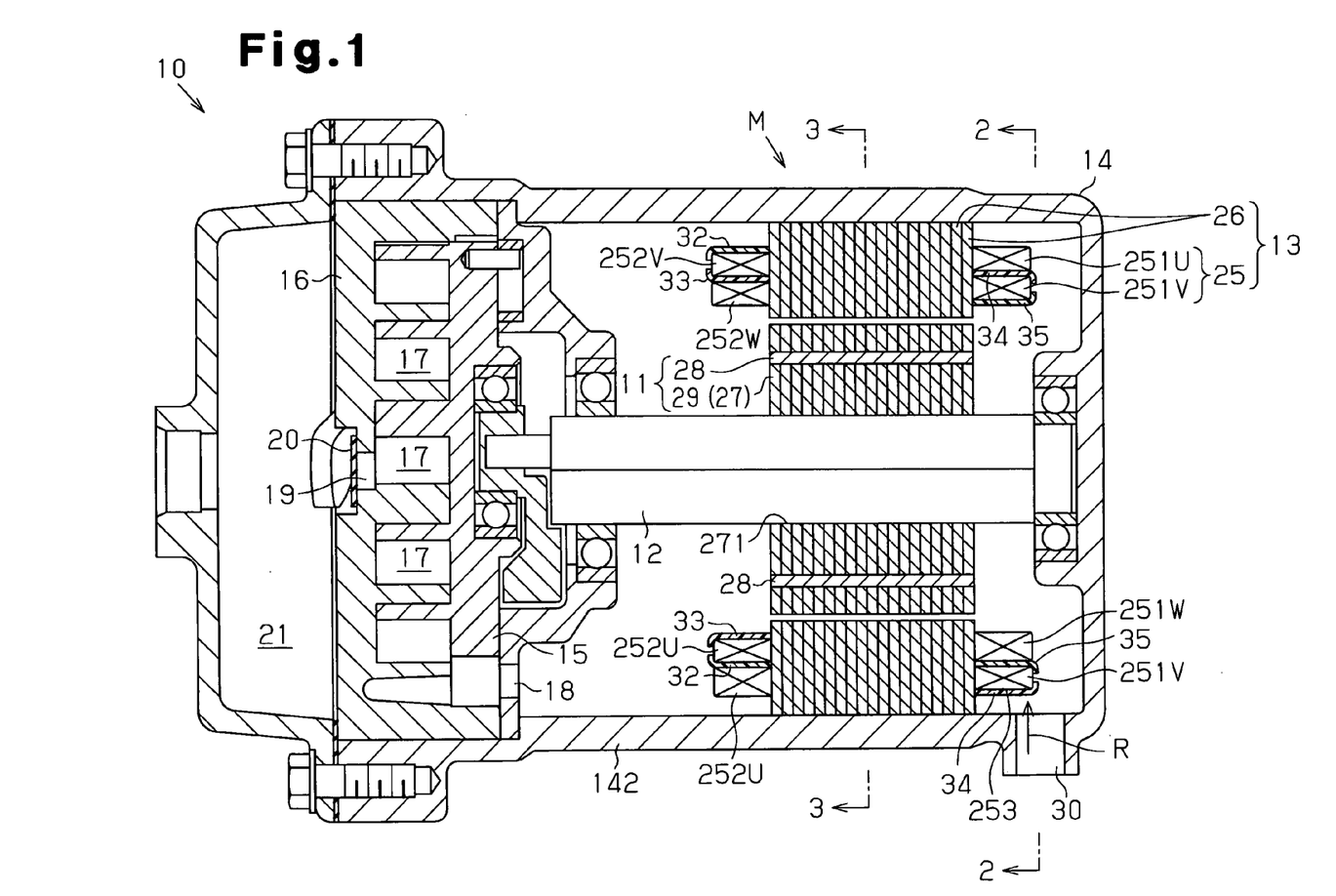
FIG. 1 is a side view showing the entirety of an electric compressor according to a first embodiment of the present invention.

An electric compressor 10 shown in FIG. 1 is a scroll electric compressor and includes a rotating electric machine M. The rotating electric machine M includes a rotor 11, a rotary shaft 12, a stator 13, and a motor housing 14. The rotor 11 is secured to the rotary shaft 12, and the stator 13 is fitted and fixed to an inner circumferential surface of the motor housing 14. The electric compressor 10 has an orbiting scroll 15 serving as a compression motion body. The orbiting scroll 15 orbits as the rotary shaft 12 rotates. Accordingly, the volume of each of compression chambers 17 between the orbiting scroll 15 and a fixed scroll 16 is reduced.

An inlet port 30 is provided in a circumferential wall 142 of the motor housing 14. The inlet port 30 is connected to an external refrigerant circuit (not shown), and refrigerant (gas) is conducted into the motor housing 14 from the external refrigerant circuit through the inlet port 30. Orbiting motion (suction motion) of the orbiting scroll 15 causes refrigerant guided into the motor housing 14 to be drawn into the compression chambers 17 through passages 141 (see FIGS. 2 and 3) between the inner circumferential surface of the motor housing 14 and the outer circumferential surface of the stator 13, and a suction port 18. The orbiting motion (suction motion) of the orbiting scroll 15 also causes the refrigerant in the compression chambers 17 to be discharged to a discharge chamber 21 through a discharge port 19 while flexing a discharge valve 20. The refrigerant in the discharge chamber 21 flows out to the external refrigerant circuit and then returns into the motor housing 14.

Figure 2:
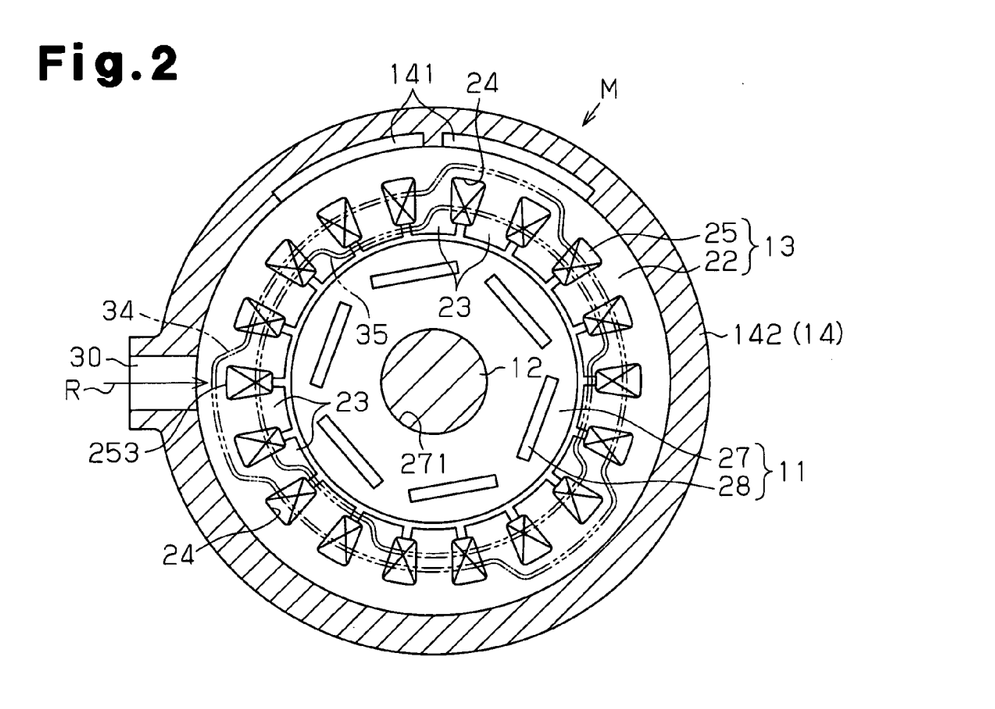
FIG. 2 is a cross-sectional view taken along line 2-2 in FIG. 1.
Figure 3:
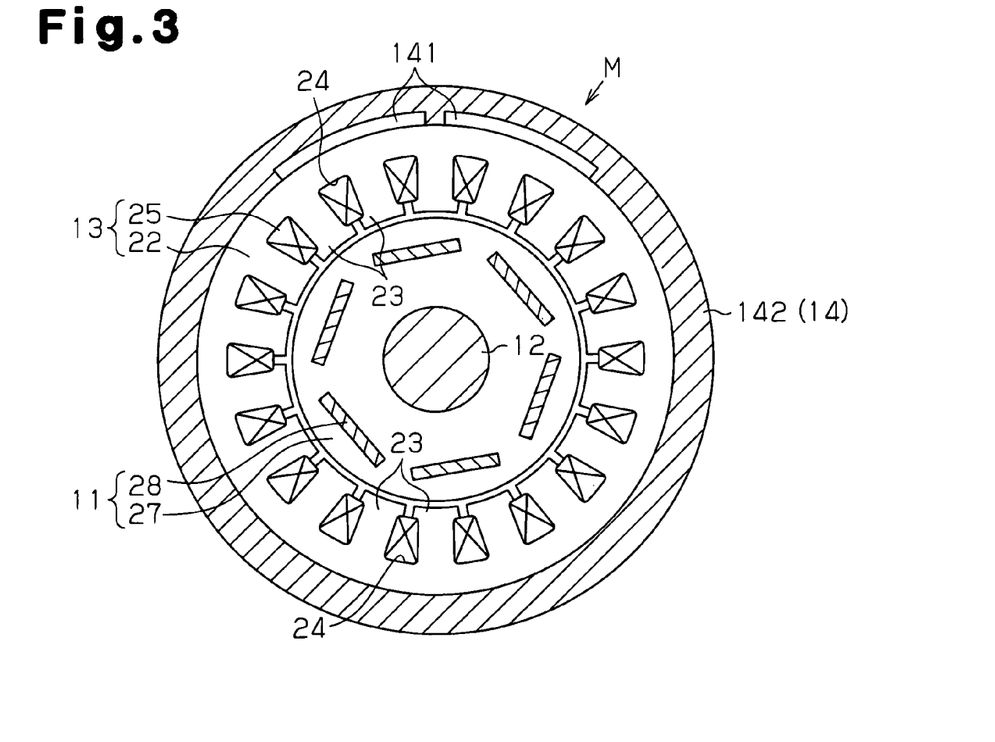
FIG. 3 is a cross-sectional view taken along line 3-3 in FIG. 1.

As shown in FIGS. 2 and 3, the stator 13 includes an annular stator core 22, teeth 23 arranged on the inner circumference of the stator core 22, and coils 25 that pass through slots 24 defined between the teeth 23. In the present embodiment, the number of the teeth 23 and the number of the slots 24 are eighteen each. The slots 24 are arranged along the circumferential direction of the stator 13 at regular intervals.

As shown in FIG. 1, the stator core 22 is formed by laminating core plates 26, which are magnetic bodies (steel plates). The rotor 11 includes a rotor core 27 and a plurality of permanent magnets 28 embedded in the rotor core 27. The rotor core 27 is formed by laminating core plates 29, which are magnetic bodies (steel plates). A shaft hole 271 extends through a center of the rotor core 27, and the rotary shaft 12 is fixed to the shaft hole 271.

Figure 6:
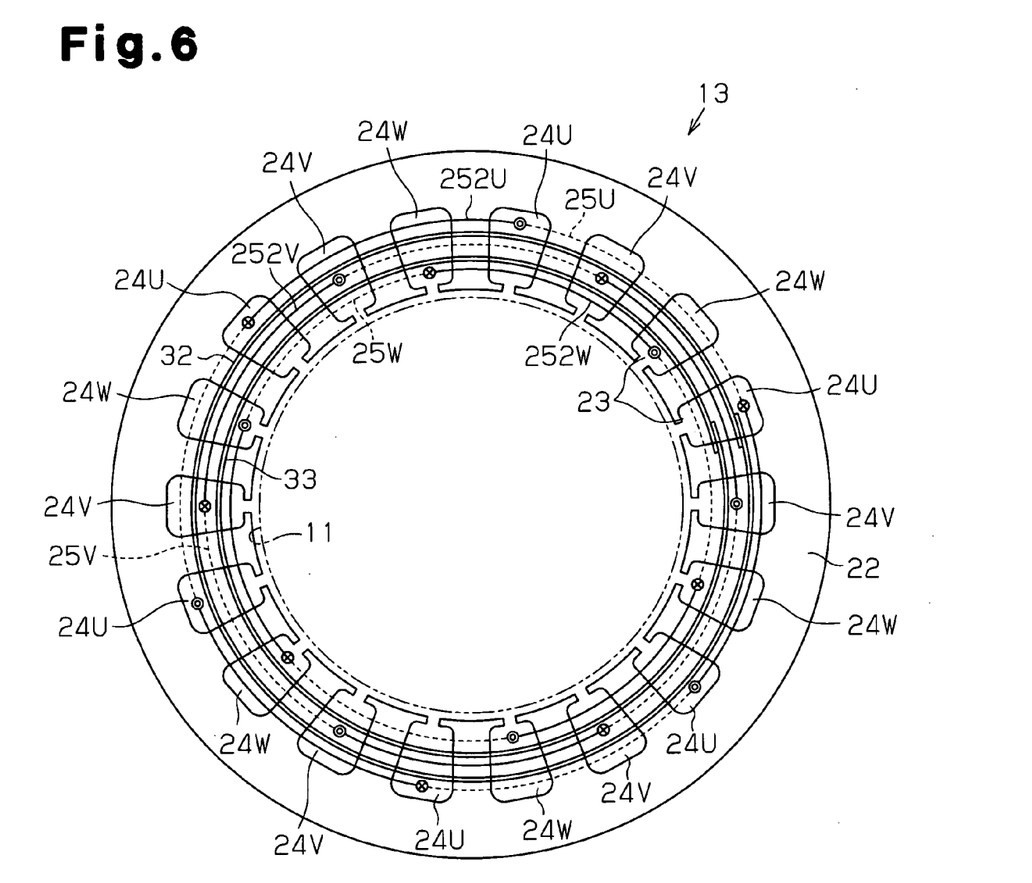

FIG. 6 is a diagram representing the front side of the stator 13 (in FIG. 1, the left side is defined as a front side, and the right side is defined as a rear side). The coils 25, which pass through the slots 24, are wound in a wave winding. In each slot 24, the coil 25 is separated from the inner walls of the slot 24 by an insulation sheet (not shown).

A U-phase coil 25U passes through a group of first slots 24U. A V-phase coil 25V passes through a group of second slots 24V, and a W-phase coil 25W passes through a group of third slots 24W. Parts of the phase coils 25U, 25V, 25W that are represented by solid lines are parts that are arranged on an end face of the stator core 22 at the front side of the stator 13, and parts of the phase coils 25U, 25V, 25W that are represented by broken lines are parts that are arranged on an end face of the stator core 22 at the rear side of the stator 13. Parts of each of the phase coils 25U, 25V, 25W between the solid line parts and the broken line parts are parts that pass through the slots 24U, 24V, 24W.

At the front side of the stator 13, coil ends 252U of 35 the U-phase coil 25U protrude from the slots 24U, and coil ends 252V of the V-phase coil 25V protrude from the slots 24V. A first phase-to-phase insulation sheet 32 is arranged between the coil ends 252U and the coil ends 252V. The first phase-to-phase insulation sheet 32 is spread to encompass the entire circumference of the rotor 11. At the front side of the stator 13, coil ends 252V of the V-phase coil 25V protrude from the slots 24V, and coil ends 252W of the W-phase coil 25W protrude from the slots 24W. A second phase-to-phase insulation sheet 33 is arranged between the coil ends 252V and the coil ends 252W. The second phase-to-phase insulation sheet 33 is spread to encompass the entire circumference of the rotor 11. The first and second phase-to-phase insulation sheets 32, 33 are both made of synthetic resin and formed into a belt. The ends of each of the belt-like first and second phase-to-phase insulation sheets 32, 33 are overlapped.

Figure 5:
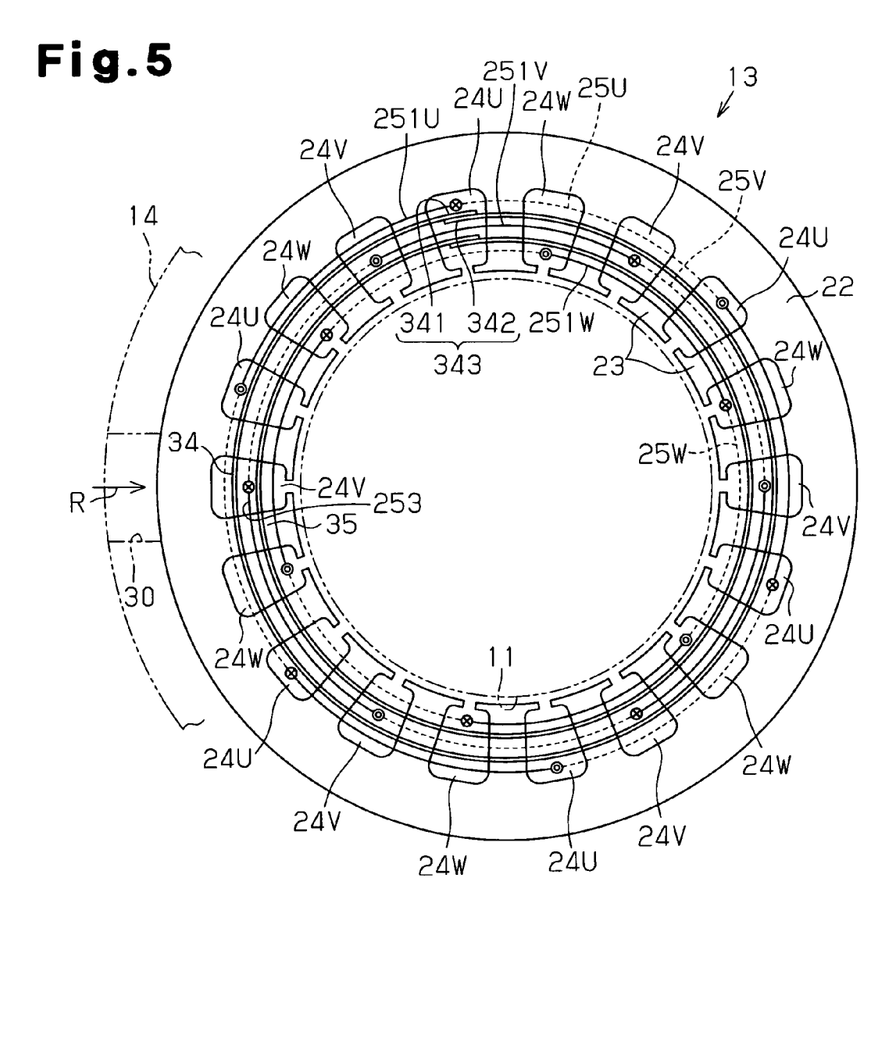
FIGS. 5 and 6 are diagrams for explaining wave winding.

FIG. 5 is a diagram showing the rear side of the stator 13. Parts of each of the phase coils 25U, 25V, 25W that are represented by solid lines are parts that are arranged on an end face of the stator core 22 at the rear side of the stator 13, and parts of each of the phase coils 25U, 25V, 25W that are represented by broken lines are parts that are arranged on an end face of the stator core 22 at the front side of the stator 13.

At the rear side of the stator 13, coil ends 251U of the U-phase coil 25U protrude from the slots 24U, and coil ends 251V of the V-phase coil 25V protrude from the slots 24V. A third phase-to-phase insulation sheet 34 is arranged between the coil ends 251U and the coil ends 251V. The third phase-to-phase insulation sheet 34 is spread to encompass the entire circumference of the rotor 11. At the rear side of the stator 13, coil ends 251V of the V-phase coil 25V protrude from the slots 24V, and coil ends 251W of the W-phase coil 25W protrude from the slots 24W. A fourth phase-to-phase insulation sheet 35 is arranged between the coil ends 251V and the coil ends 251W. The fourth phase-to-phase insulation sheet 35 is spread to encompass the entire circumference of the rotor 11. The third phase-to-phase insulation sheet 34 is located outside of the fourth phase-to-phase insulation sheet 35. The fourth phase-to-phase insulation sheet 35, which is located inside, is encompassed by the third phase-to-phase insulation sheet 34, which is located outside. The third and fourth phase-to-phase insulation sheets 34, 35 are both made of synthetic resin and formed into a belt. The ends of each of the belt-like third and fourth phase-to-phase insulation sheets 34, 35 are overlapped.

Figure 4:
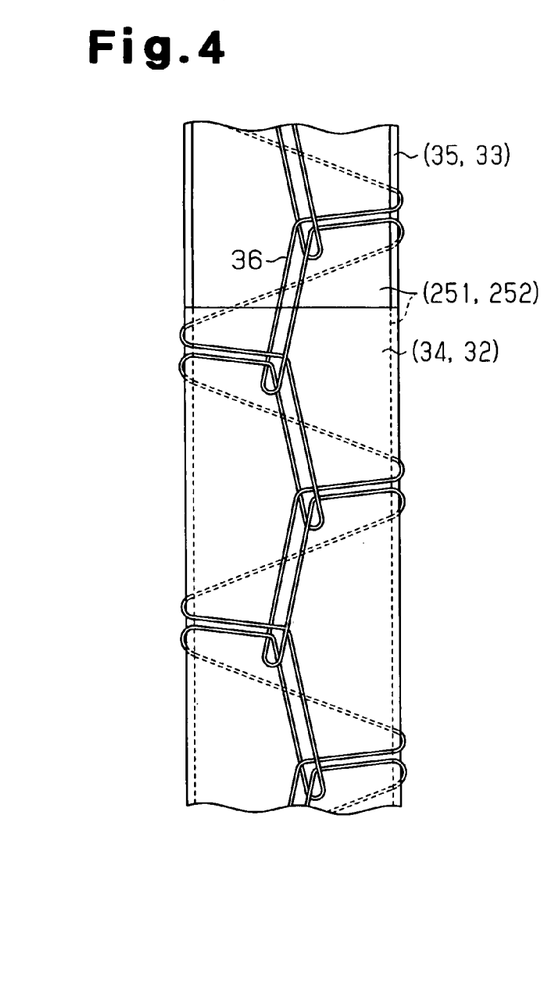
FIG. 4 is a schematic side view showing a part of the phase-to-phase insulation sheet shown in FIG. 1.

As shown in FIG. 4, the coil ends 251, 252 protruding from the slots 24 (see FIGS. 2 and 3) and the phase-to-phase insulation sheets 32, 33, 34, 35 are bound by a string 36. The coil ends 251 collectively represent the coil ends 251U, 251V, 251W, and the coil ends 252 collectively represent the coil ends 252U, 252V, 252W.

As shown in FIG. 1, the inflow direction of refrigerant from the inlet port 30 into the motor housing 14 (indicated by arrow R) is substantially parallel to a plane that is perpendicular to the rotary shaft 12. Such inflow direction R of refrigerant intersects an outside portion 253 of one of the coil ends 251V of the V-phase coil 25V that protrude from the slots 24V at the rear side of the stator 13. A part of the third phase-to-phase insulation sheet 34 covers an outside portion (referred to as an intersection surface 253) of the coil end 251V that intersects the inflow direction R. The intersection surface 253 is covered by the third phase-to-phase insulation sheet 34, and a part of the third phase-to-phase insulation sheet 34 faces the inlet port 30. The flow of refrigerant from the inlet port 30 into the motor housing 14 collides with the third phase-to-phase insulation sheet 34.

The first embodiment has the following advantages.

(1) The inflow direction R of refrigerant gas from the inlet port 30 into the motor housing 14 intersects the third phase-to-phase insulation sheet 34. Thus, foreign matter in the suction refrigerant gas collides with the third phase-to-phase insulation sheet 34, which prevents the coil end 251V of the V-phase coil 25V from being damaged. Since the third phase-to-phase insulation sheet 34 insulating between phases of the coils 25 prevents the coils 25 from being damaged by foreign matter in suction refrigerant gas, no dedicated part for preventing the coils 25 from being damaged is needed.

(2) The third phase-to-phase insulation sheet 34 covers the intersection surface 253 of one of the coil ends 251V of the V-phase coil 25V as viewed in the radial direction of the rotary shaft 12. In other words, the inflow direction R of gas intersects the third phase-to-phase insulation sheet 34. In the configuration in which the inlet port 30 is formed in the circumferential wall 142 of the motor housing 14, damages to the coils 25 can be avoided without increasing the size of the third phase-to-phase insulation sheet 34, more specifically without increasing the width of the third phase-to-phase insulation sheets 34 along the axial direction of the rotary shaft 12.

(3) In the present embodiment, the motor housing 14 is fitted to the stator 13 such that a part of the third phase-to-phase insulation sheet 34 that is located at a position not covered by the coil ends 251U of the U-phase coil 25U faces the inlet port 30. In this configuration, the part of the third phase-to-phase insulation sheet 34 located at the position not covered by the coil ends 251U intersects the inflow direction R of refrigerant gas. The stator 13 is easily fitted to the thus configured motor housing 14.

(4) If an overlapping part 343 (shown in FIG. 5) of the phase-to-phase insulation sheets 34 in the circumferential direction of the annular stator 13 is short, refrigerant and foreign matter can pass through the space between the end portions 341, 342 of the phase-to-phase insulation sheets 34 and damage the coils 25. In such a case, it is preferable, as in the present embodiment, that the inflow direction R of refrigerant gas intersect part of the phase-to-phase insulation sheets 34 other than the overlapping part 343.

A second embodiment of the present invention will now be described with reference to FIGS. 7A and 7B. The same reference numerals are given to those components that are the same as the corresponding components of the first embodiment.

Figure 7A:
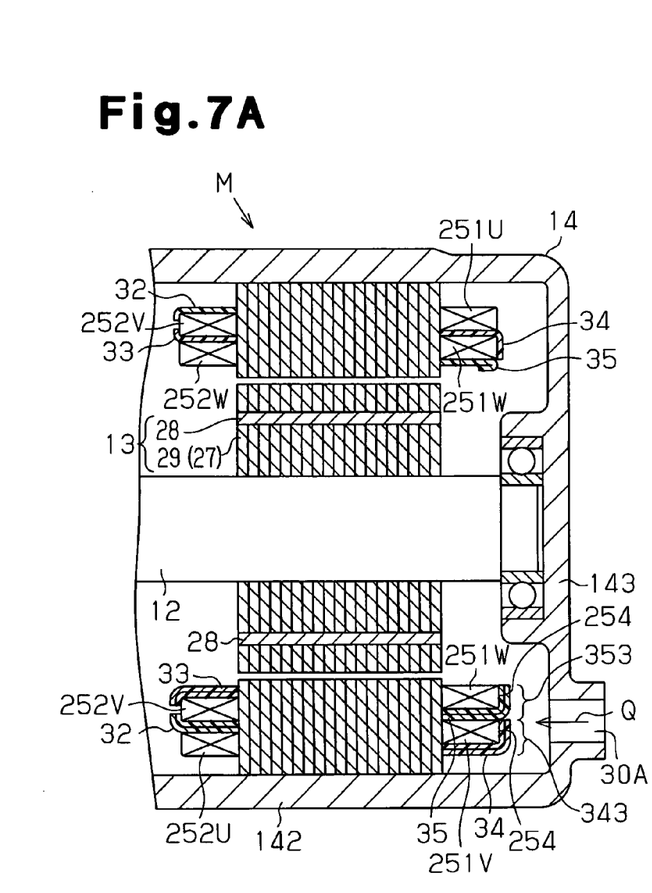
FIG. 7A is a cross-sectional side view showing a part of an electric compressor according to a second embodiment of the present invention.
Figure 7B:
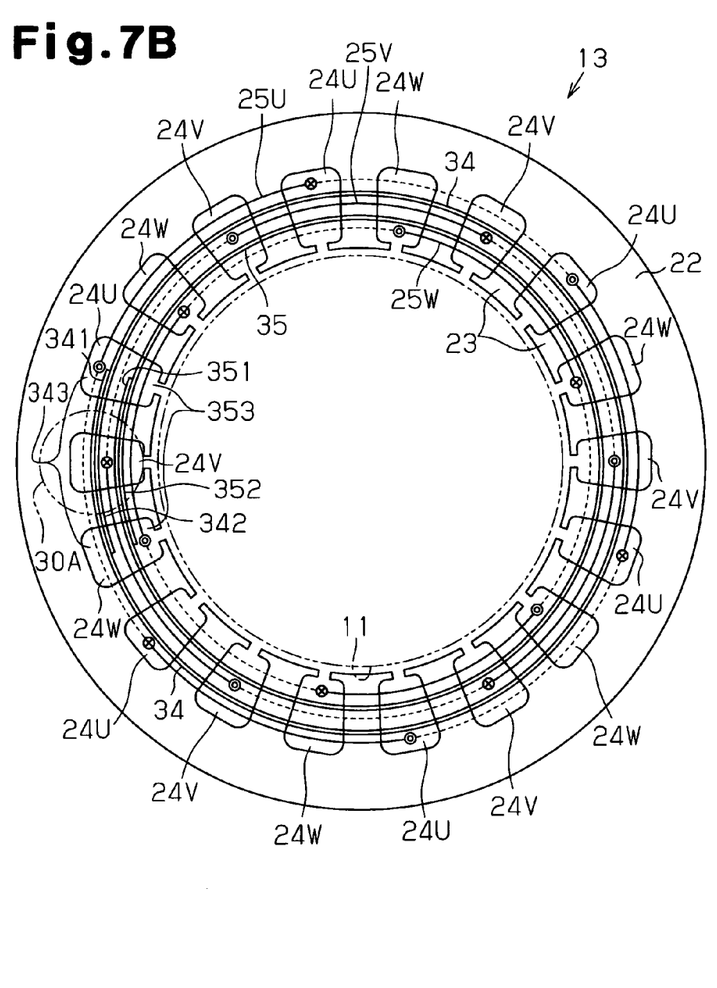
FIG. 7B is a diagram showing the stator shown in FIG. 7A.

As shown in FIG. 7A, an inlet port 30A is formed in an end wall 143 of a motor housing 14. An inflow direction of refrigerant gas from the inlet port 30A into the motor housing 14 (shown by arrow Q) intersects an end portion of one of coil ends 251V of a V-phase coil 25V and an end portion of one of coil ends 251W of a W-phase coil 25W. An end portion of the coil end 251V that intersects the inflow direction Q of refrigerant gas (hereinafter referred to as an intersection surface 254) is covered by an overlapping part 343 of the end portions 341, 351 of the third phase-to-phase insulation sheet 34. An end portion of the coil end 251W that intersects the inflow direction Q of refrigerant gas (hereinafter referred to as an intersection surface 254) is covered by an overlapping part 353 of the end portions 351, 352 of the fourth phase-to-phase insulation sheet 35.

Refrigerant gas that flows from the inlet port 30A into the motor housing 14 collides with the overlapping parts 343, 353. Therefore, foreign matter in suction refrigerant gas collides with the overlapping parts 343, 353. Accordingly, the intersection surfaces 254 of the coil ends 251V, 251W are prevented from being damaged.

Compared to the phase-to-phase insulation sheets 34, 35 according to the first embodiment, the phase-to-phase insulation sheets 34, 35 of the second embodiment have a greater width along the axial direction of the rotary shaft 12. That is, if the size of a phase-to-phase insulation sheet is enlarged in the axial direction of the rotary shaft 12, coils are prevented from being damaged even if refrigerant gas is conducted into the motor housing 14 along the axial direction of the rotary shaft 12 from the end wall 143 of the motor housing 14.

The overlapping part 343 is formed by overlapping the end portions of the third phase-to-phase insulation sheet 34, and the overlapping part 353 is formed by overlapping the end portions of the fourth phase-to-phase insulation sheet 35. That is, the overlapping parts 343, 353 are formed by two phase-to-phase insulation sheets. Therefore, compared to a case where only one insulation sheet is provided, the coils 25 are effectively prevented from being damaged by collision of foreign matter in refrigerant gas. If the lengths of the overlapping parts 343, 353 of the phase-to-phase insulation sheets 34, 35 in the circumferential direction of the annular stator 13 are long, and no foreign matter is unlikely to enter toward the intersection surfaces 254 of the coil ends 251V, 251W through the space between the end portions 341, 342 of the phase-to-phase insulation sheets 34, the inflow direction R of refrigerant gas preferably intersects the overlapping parts 343, 353.

A third embodiment will now be described with reference to FIG. 8. The same reference numerals are given to those components that are the same as the corresponding components of the first embodiment.

Figure 8:
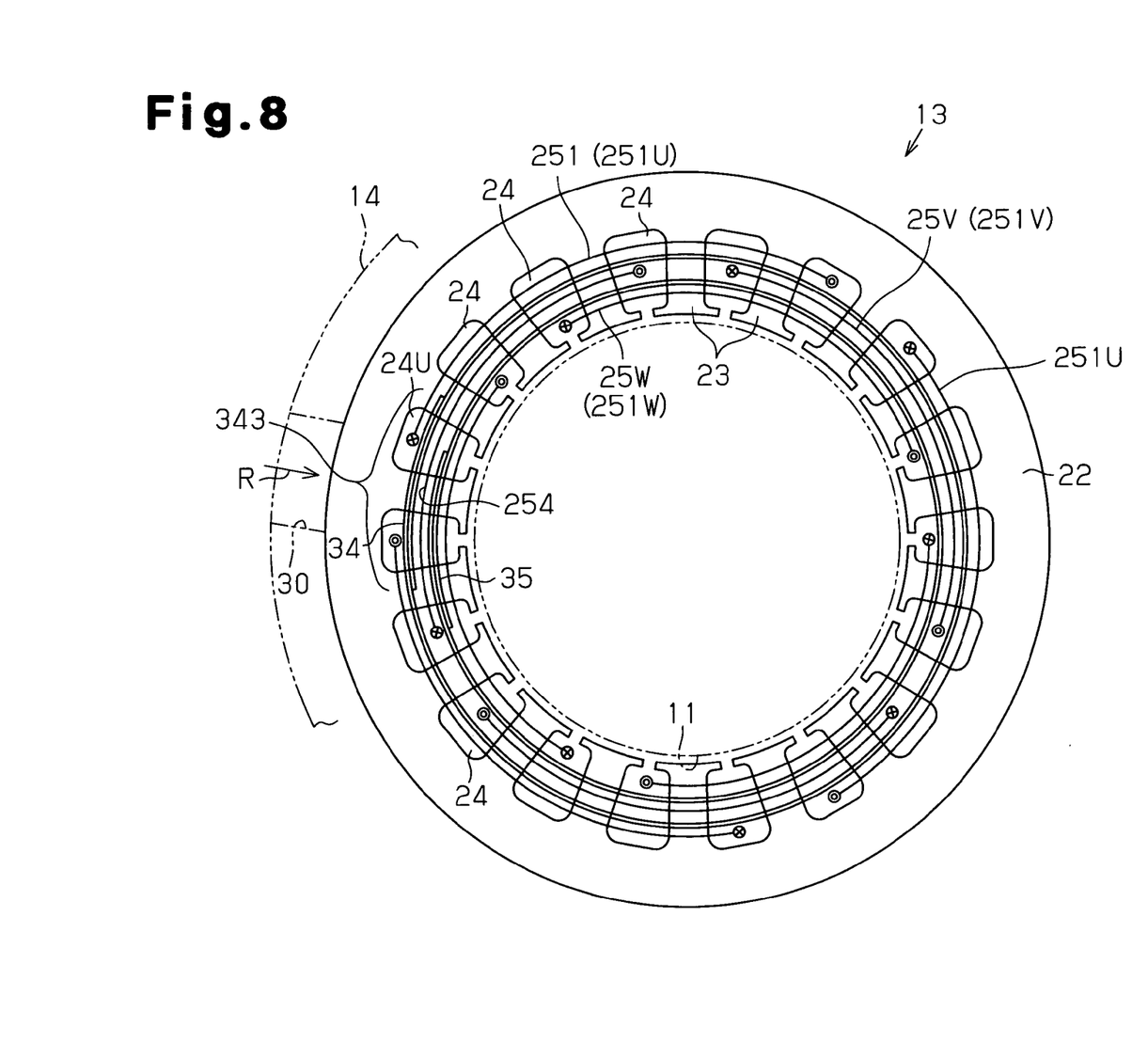
FIG. 8 is a diagram showing a stator of an electric compressor according to a third embodiment of the present invention.

FIG. 8 shows one example of distributed winding. An overlapping part 343 of a third phase-to-phase insulation sheet 34 covers an intersection surface 254 of the coil end 251V of the V-phase coil 25V that faces an inlet port 30. An inflow direction R of refrigerant gas entering the motor housing 14 from the inlet port 30 intersects the overlapping part 343 of the third phase-to-phase insulation sheet 34. Thus, foreign matter in the suction refrigerant gas collides with the overlapping part 343 of the third phase-to-phase insulation sheet 34, which prevents the coil end 251V of the V-phase coil 25V from being damaged.

The present invention may also be embodied in the following forms.

Phase-to-phase insulation sheets may be annular and endless insulation sheets.

The present invention may be applied to an electric compressor in which an inlet port is directed to a coil end at the front end of the motor housing.

In the second embodiment, one of the belt-like phase-to-phase insulation sheets may have a covering portion that extends along the direction of width from a part in the longitudinal side, and the covering-portion may be arranged to face the inlet port 30A.

In the example shown in FIG. 5, the overlapping part 343 of the third phase-to-phase insulation sheet 34 is virtually unnecessary for ensuring the phase-to-phase insulation. Thus, the length of the third phase-to-phase insulation sheet 34 along the circumferential direction of the stator 13 may be shorter than the length of the entire circumference of the stator 13. Also, the third phase-to-phase insulation sheet 34 does not need to be annular. Specifically, the third phase-to-phase insulation sheet 34 does not need to be formed in a section that is not covered by the coil end 251U of the U-shape coil 25U. In a rotating electric machine that achieves phase-to-phase insulation even if a phase-to-phase insulation sheet 34 that is shorter than the entire circumference of the stator 13 is used, the phase-to-phase insulation sheet 34, which is shorter than the entire circumference of the stator 13, is extended in the circumferential direction, and the extended portion is arranged to face the inlet port 30, so as to avoid damages to the coil ends 251V.

The present invention may be applied to a rotating electric machine of concentric winding or concentrated winding if phase-to-phase insulation sheets are used and the inflow direction of gas at an inlet port intersects a coil end.

The present invention may be applied to electric compressors other than scroll electric compressors (for example, piston compressors). Pistons are compression motion bodies.

The invention claimed is:
1. An electric compressor, in which gas in a motor housing of a rotating electric machine is drawn into a compression chamber via an inlet port formed in the motor housing by a suction motion of a compression motion body based on rotation of a longitudinally extending rotary shaft driven by the rotating electric machine, and the gas in the compression chamber being discharged by discharge motion of the compression motion body based on the rotation of the rotary shaft,
wherein the rotating electric machine includes:
a rotor secured to the rotary shaft;
a longitudinally extending annular stator having a first end proximate to the compression motion body and a second opposite end proximate to the inlet port;
a plurality of radially extending teeth arranged on an inner circumference of the stator;
a plurality of coils of different phases, which pass through slots between the teeth, each coil having a coil end extending beyond an end of the stator in the longitudinal direction of the rotary shaft, the plurality of coil ends form a coil end portion as a whole, the coil end portion having an outer circumferential periphery and an inner circumferential periphery;
a first phase-to-phase insulation sheet having a belt-like shape and located between coils of different phases at the first end of the stator, the first phase-to-phase insulation sheet extends to encompass an entire circumference of the rotor; and a second phase-to-phase insulation sheet having a belt-like shape and located between coils of different phases at the second end of the stator, the second phase-to-phase insulation sheet extends to encompass an entire circumference of the rotor, wherein, the inlet port drawing gas from the outside of the motor housing, an inflow direction of the gas flowing through the inlet port intersects at least one of the coil ends, the outer circumferential periphery of the coil end portion at the second end of the stator includes a covered portion, wherein a plurality of the coil ends are covered by the second phase-to-phase insulation sheet and an uncovered portion wherein a plurality of the coil ends are not covered by the second phase-to-phase insulation sheet, and a part of the second phase-to-phase insulation sheet which covers an intersection surface of the covered portion intersecting the inflow direction faces the inlet port.

2. The compressor according to claim 1, wherein the inlet port is provided in a circumferential wall of the motor housing, and wherein the inflow direction of the gas intersects an outside portion of the coil end.

3. The compressor according to claim 1, wherein the inlet port is provided in an end wall of the motor housing, and wherein the inflow direction of the gas intersects an end portion of the coil end.

4. The compressor according to claim 1, wherein the coils are wound in wave winding or distributed winding.

5. The compressor according to claim 4, wherein the coils include a U-phase coil, a V-phase coil, and a W-phase coil, each of the first and second phase-to-phase insulation sheets including an outer phase-to-phase insulation sheet located between the coil ends of the U-phase coil and the coil ends of the V-phase coil and an inner phase-to-phase insulation sheet located between the coil ends of the V-phase coil and the coil ends of the W-phase coil and, wherein the phase-to-phase insulation sheet that faces the inlet port is the outer phase-to-phase insulation sheet of the second phase-to-phase insulation sheet.

6. The compressor according to claim 1, wherein each of the first and second phase-to-phase insulation sheets has a first longitudinal end and a second longitudinal end, with the first longitudinal end overlapping the second longitudinal end.

7. An electric compressor, in which gas in a motor housing of a rotating electric machine is drawn into a compression chamber via an inlet port formed in the motor housing by a suction motion of a compression motion body based on rotation of a rotary shaft driven by the rotating electric machine, and the gas in the compression chamber being discharged by discharge motion of the compression motion body based on the rotation of the rotary shaft, wherein the rotating electric machine includes:

a rotor secured to the rotary shaft;

an annular stator;

a plurality of teeth arranged on an inner circumference of the stator;

a plurality of coils of different phases passing through slots between the teeth, the plurality of coils include a plurality of coil ends, which form a coil end portion as a whole;

a first phase-to-phase insulation sheet having a belt-like shape and located between coils of different phases proximate to the compression motion body, the first phase-to-phase insulation sheet extends to encompass an entire circumference of the rotor; and a second phase-to-phase insulation sheet having a belt-like shape and located between coils of different phases proximate to the inlet port, the phase-to-phase insulation sheet extends to encompass an entire circumference of the rotor, wherein the inlet port drawing gas from an outside of the motor housing, an inflow direction of the gas flowing through the inlet port intersects as least one of the coil ends, an outer periphery of the coil end portion includes a covered portion, which is covered by the second phase-to-phase insulation sheet and an uncovered portion, which is not covered by the second phase-to-phase insulation sheet, the coil ends are positioned in a peripheral direction of the rotating electric machine so that a part of the second phase-to-phase insulation sheet which covers an intersection surface of the covered portion intersecting the inflow direction faces the inlet port and that the uncovered portion does not face the inlet port, and the covered portion and the uncovered portion are arranged alternately in the peripheral direction.

8. An electric compressor, in which gas in a motor housing of a rotating electric machine is drawn into a compression chamber via an inlet port formed in the motor housing by a suction motion of a compression motion body based on rotation of a rotary shaft driven by the rotating electric machine, and the gas in the compression chamber being discharged by discharge motion of the compression motion body based on the rotation of the rotary shaft, wherein the rotating electric machine includes:

a rotor secured to the rotary shaft;

an annular stator;

a plurality of teeth arranged on an inner circumference of the stator;

a plurality of coils of different phases passing through slots between the teeth, the plurality of coils include a plurality of coil ends, which form a coil end portion as a whole; and a first phase-to-phase insulation sheet having a belt-like shape with a first longitudinal end and a second longitudinal end and located between coils of different phases proximate to the compression motion body, the first phase-to-phase insulation sheet extends to encompass an entire circumference of the rotor with the first longitudinal end overlapping the second longitudinal end; and a second phase-to-phase insulation sheet having a belt-like shape with a first longitudinal end and a second longitudinal end and located between coils of different phases proximate to the inlet port, the second phase-to-phase insulation sheet extends to encompass an entire circumference of the rotor with the first longitudinal end overlapping the second longitudinal end, wherein, the inlet port drawing gas from the outside of the motor housing, wherein an inflow direction of the gas flowing through the inlet port intersects at least one of the coil ends, wherein a part of the second phase-to-phase insulation sheet faces the inlet port and covers an intersection surface of the coil end that intersects the inflow direction, wherein an outer periphery of the coil end portion includes a covered portion, which is covered by the second phase-to-phase insulation sheet and an uncovered portion, which is not covered by the second phase-to-phase insulation sheet, and wherein the coil ends are positioned in a peripheral direction of the rotating electric machine so that the second phase-to-phase insulation sheet covered portion faces the inlet port.

* * * * *